US012579119B2

(12) United States Patent
Sridhar et al.

(10) Patent No.: US 12,579,119 B2
(45) Date of Patent: Mar. 17, 2026

(54) SELECTIVE SPOOL DATA STORAGE IN AN OBJECT STORE OR LOCAL DATABASE STORAGE

(71) Applicant: TERADATA US, INC., San Diego, CA (US)

(72) Inventors: Pradeep Sridhar, Fremont, CA (US); Showvick Kalra, Manhattan Beach, CA (US); Bin Lin, San Diego, CA (US); Chad Brandon Seeraty, Cypress, CA (US); Bo Hao Tan, Monterey Park, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/396,923

(22) Filed: Dec. 27, 2023

(65) Prior Publication Data

US 2025/0217339 A1      Jul. 3, 2025

(51) Int. Cl.
| *G06F 16/24* | (2019.01) |
| *G06F 16/21* | (2019.01) |
| *G06F 16/22* | (2019.01) |
| *G06F 16/2453* | (2019.01) |

(52) U.S. Cl.
CPC ........ *G06F 16/217* (2019.01); *G06F 16/2246* (2019.01); *G06F 16/24542* (2019.01)

(58) Field of Classification Search
None
See application file for complete search history.

(56) References Cited

U.S. PATENT DOCUMENTS

| | | | | |
|---|---|---|---|---|
| 6,950,786 | B1 * | 9/2005 | Sonneland | G01V 1/301 |
| | | | | 703/2 |
| 8,108,382 | B1 * | 1/2012 | Brown | G06F 16/2471 |
| | | | | 707/718 |
| 8,782,231 | B2 * | 7/2014 | Jackson | G06F 9/5077 |
| | | | | 709/224 |
| 9,075,657 | B2 * | 7/2015 | Jackson | H04L 47/83 |
| 2008/0086480 | A1 * | 4/2008 | Srivastava | G06F 16/27 |
| 2008/0288561 | A1 * | 11/2008 | Croisettier | G06F 16/2477 |
| 2013/0035802 | A1 * | 2/2013 | Khaitan | G05B 15/02 |
| | | | | 700/297 |
| 2015/0236973 | A1 * | 8/2015 | Jackson | H04L 67/10 |
| | | | | 709/226 |

(Continued)

OTHER PUBLICATIONS

Brantner et al., Building a Database on S3, SIGMOD'08, Jun. 9-12, 2008 (13 pages).

(Continued)

*Primary Examiner* — Eliyah S. Harper
(74) *Attorney, Agent, or Firm* — Trop Pruner Hu

(57) ABSTRACT

In some examples, a database system includes processing modules with access to a remote object store and a local database storage associated with the database system. The processing modules perform a database operation that involves use of a plurality of instances of spool data. The processing modules store a first instance of spool data in the remote object store based on a first characteristic of the first instance of spool data, and the processing modules store a second instance of spool data in the local database storage based on a second characteristic of the second instance of spool data.

20 Claims, 3 Drawing Sheets

(56) References Cited

U.S. PATENT DOCUMENTS

| | | | |
|---|---|---|---|
| 2021/0074286 A1 * | 3/2021 | Cotting | G06F 3/165 |
| 2025/0077523 A1 * | 3/2025 | Nakott | G06F 16/24549 |

OTHER PUBLICATIONS

Teradata, Teradata Announces VantageCloud Lake for Driving Analytical Innovation at Scale, Aug. 29, 2022 (9 pages).

Eric Avidon, Business Analytics, Teradata makes VantageCloud Lake available on Azure, Jul. 11, 2023 (4 pages).

Teradata, Teradata VantageCloud Lake, Teradata's next-generation, cloud-native analytics and data platform, Downloaded Dec. 21, 2023 (2 pages).

Teradata Vantage / Datasheet, Say "Yes!" to Teradata Vantage on AWS, 2021 (2 pages).

* cited by examiner

SELECTIVE SPOOL DATA STORAGE IN AN OBJECT STORE OR LOCAL DATABASE STORAGE

BACKGROUND

A relational database management system (DBMS) stores databases that include collections of logically related data arranged in relational tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud, a data center, or any other computing environment that is accessible over a network.

BRIEF DESCRIPTION OF THE DRAWINGS

Some implementations of the present disclosure are described with respect to the following figures.

Figure 1:
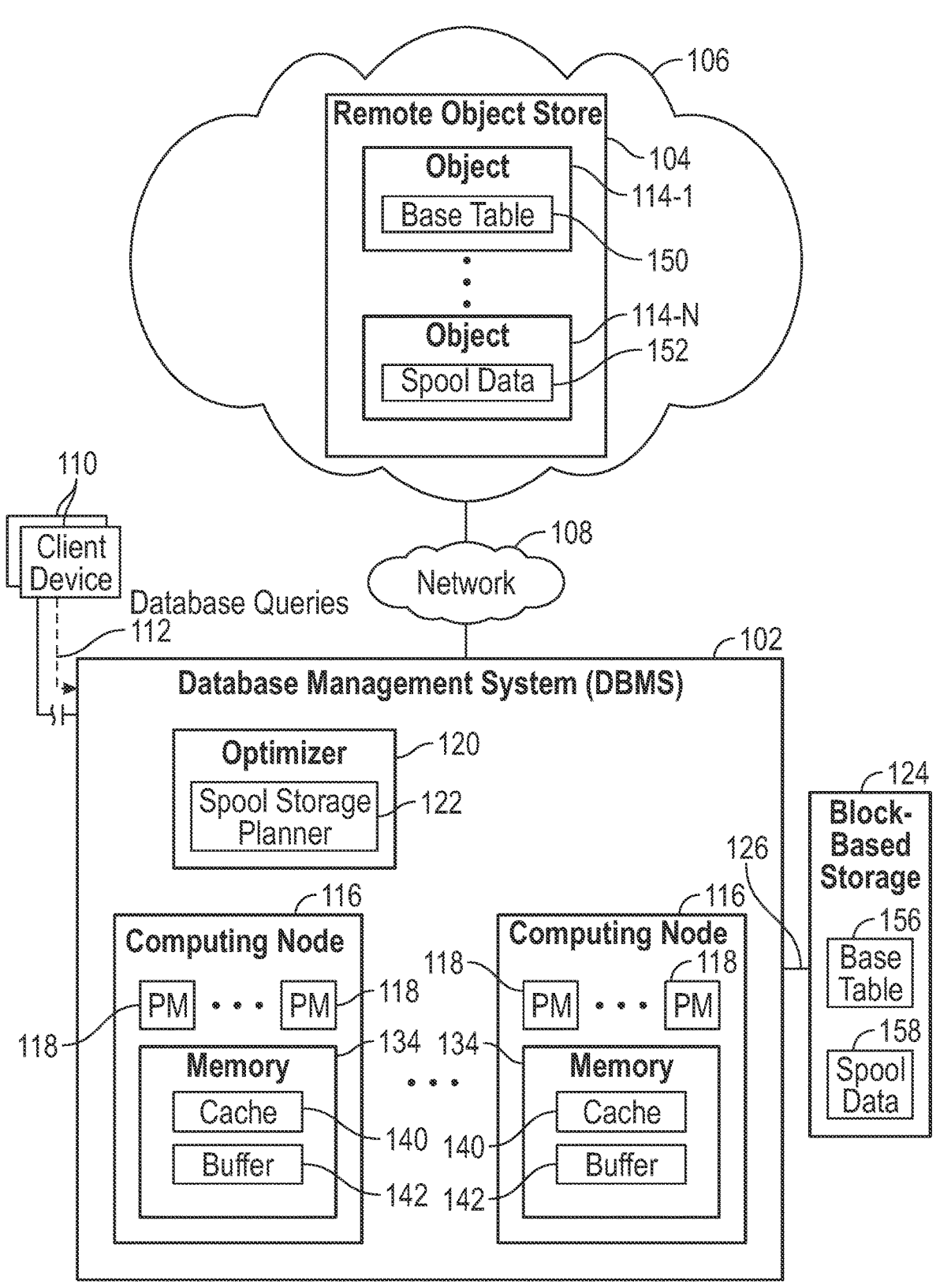
FIG. 1 is a block diagram of an example arrangement including a remote object store and a database management system, according to some examples of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Traditionally, a DBMS stores data of tables in a block-based storage, in which data is stored as blocks of specified sizes. A "table" can refer to a relational table of a database created to store specific data records.

In some examples, a block-based storage can include disk-based storage devices, solid state drives, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, in addition to coupling block-based storage to the DBMS, the DBMS can also store data in a remote object store, which can be provided in the cloud or another remote computing environment. In such examples, block-based storage can be used with the DBMS to store some data involved in database operations, while the remote object store can store other data involved in database operations.

Relational tables of a DBMS are considered primary data, which is data (in the form of tables) that is to be consumed by users of the DBMS. "Users" can refer to human users, programs, or machines.

Primary data is contrasted with "spool data," which can include temporary data or any other type of intermediate data produced during a database operation and that is to be deleted after the database operation is over. Spool data can include spool tables, spool files, metadata such as indexes associated with the spool tables or spool files, or any other container of temporary or intermediate data.

In the ensuing discussion, reference is made to spool tables. More generally, techniques or mechanisms according to some implementations of the present disclosure may be applied to instances of spool data, where an "instance of spool data" can refer to a spool table, a spool file, metadata such as indexes associated with the spool table or spool file, or any other container of temporary or intermediate data.

When the DBMS processes a database query, one or more spool tables can be created to store intermediate data that can be used in various phases of a database operation performed for the database query. For example, the database operation may include a sort operation followed by a join operation. The sort operation sorts rows of a first base relational table. The sorted rows can be placed in a spool table. The sorted rows of the spool table can then be joined with rows of a second base relational table to produce an output table that includes a result of the join. In further examples, a database operation can include a collection of multiple individual operations, and results of the individual operations can be placed in spool tables for use in subsequent individual operations.

A spool table may be discarded once the database operation is completed, although it may be possible in some cases that the spool table may be stored for various reasons. Generally, spool tables are stored for a shorter period of time than base relational tables that are part of primary data.

If an operator of a DBMS ("DBMS operator") were to use a local block-based storage to store spool tables, then the DBMS operator would have to ensure that sufficient block-based storage space is available to accommodate all spool tables. Block-based storage resources (including storage devices) would have to be pre-allocated to the DBMS for the maximum anticipated size of spool tables when the DBMS is set up. Having to pre-allocate sufficient block-based storage resources to accommodate all possible spool tables can result in the pre-allocation of a large volume of storage space, which can be expensive. For example, the DBMS operator may have to purchase and install block-based storage resources with sufficient storage capacity to accommodate the spool tables, which results in increased hardware costs. Alternatively, the DBMS operator may pre-allocate the block-based storage resources from an infrastructure provider (e.g., cloud provider) of storage resources, and the infrastructure provider of the storage resources can charge the DBMS provider for the entire volume of pre-allocated block-based storage resources.

In accordance with some implementations of the present disclosure, a DBMS may selectively store a first portion of spool data in a remote object store and a second portion of spool data in a local block-based storage of the DBMS. A "portion" of spool data can refer to one or more spool tables (or portions of such one or more spool tables. The decision to use the remote object store or the local block-based storage to store a given portion of spool data may be based on the size of the given portion of spool data and possibly based on other factors.

Using the remote object store to store certain spool data (such as large spool tables) may lead to cost savings for the DBMS operator. The DBMS operator may be different from a provider ("object store provider") of the remote object store. The object store provider may be a cloud provider or any other provider that provides on-demand storage in the remote object store to customers of the object store provider. A customer (e.g., the DBMS operator) of the object store provider may request a certain amount of storage space from the object store provider. The customer is charged for storage based on a combination of how much storage space of the object store is actually used over a period of time, plus the number of times objects are accessed. Note that the DBMS operator does not have to pre-allocate storage space from the object store provider to store spool data.

Since spool data may last for a relatively short period of time (as compared to primary data), using on-demand storage space of the remote object store for storing the spool data can result in lower costs to the DBMS operator, as compared to having to pre-allocate a large volume of local block-based storage for storing the spool data. Spool tables can be stored in the remote object store on demand. Once a database operation completes and spool tables are discarded, the spool tables can be removed from the remote object store, at which point the DBMS operator is no longer charged for storing the discarded spool tables in the remote object store.

Although use of a remote object store for spool storage can result in cost savings for the DBMS operator, use of the remote object store does present some challenges. For example, the remote object store may have slower read and write input/output (I/O) speeds. In fact, the remote object store may be implemented with multiple tiers of storage that are associated with different I/O speeds. The fastest tier of storage in the remote object store may be many times slower than the I/O speeds for reading data from and writing data to local block-based storage.

The slow I/O speeds of the remote object store may not be suitable for writes of smaller pieces of spool data, such as indexes or other structures (e.g., metadata) created by a file system of the DBMS for processing spool data. The indexes or other structures associated with spool data may be relatively small in size and may be read and updated frequently, so slower I/O speeds of the remote object store can lead to reduced query response times for queries submitted to the DBMS.

The slow I/O speeds of the remote object store may also not be suitable for spool data that is to be frequently accessed (read or written). Object stores may be optimized for data that is written once and rarely updated. Data may be generally written to an object store in an append fashion, and such data is rarely updated. Although spool data blocks in a spool table may have the foregoing characteristics, the indexes and other structures associated with the spool table may not have such characteristics. For example, the indexes and other structures may be updated frequently, and writes of such indexes and other structures may be to randomly accessed locations that are not suitable for append-based storage.

The storage of data in an object store is associated with other overhead, such as overhead associated with performing data encryption, compression, or other operations. For example, when data is written to the object store, the data is encrypted and compressed. When data is read from the object store, the data is decrypted and uncompressed. The performance of encryption/decryption, compression/uncompression, and other operations can slow down writes and reads in an object store, which may not be satisfactory for certain data, such as indexes or other structures associated with spool data or any other type of spool data that is to be accessed (read or written) often.

An object store also is associated with egress charges, which refers to charges imposed by the object store provider for frequency of data access. For example, writing a data object incurs a certain charge, and reading a data object incurs another charge. The more frequently data objects are written, fetched, updated, etc., the more the egress charges. The application of such egress charges makes storing relatively small spool data in the object store not cost effective.

However, in addition to cost savings when storing large spool data, object stores do provide some benefits over traditional local block-based storage for storing certain types of spool data, such as relatively large spool tables. An object store has great elasticity since the storage space that is actually consumed can grow and contract on demand with few limitations and low impact on the DBMS. Additionally, the DBMS provider is charged for actual use of the object store, for the duration of the existence of the spool data that is actually stored in the object store. Additionally, a communication link between the DBMS and the object store has a higher bandwidth than the communication link between the DBMS and block-based storage. As used here, "bandwidth" refers to the amount of data that can be transferred over a communication link. Note that although the communication link between the DBMS and the object store is higher than the communication link between the DBMS and the block-based storage, the I/O speed of the communication link between the DBMS and the object store is lower than the I/O speed of the communication link between the DBMS and the block-based storage. By providing greater bandwidth between the DBMS and the object store, more concurrent writes and reads can be performed with respect to the object store as compared to block-based storage.

In a DBMS with multiple computing nodes, an object store can be accessed by any of the multiple computing nodes of the DBMS. In contrast, with a block-based storage, portions of the block-based storage are dedicated to specific computing nodes (or groups of computing nodes), where a first portion of the block-based storage dedicated to a first computing node (or a first group of computing nodes) is not accessible by a second computing node (or a second group of computing nodes). A "portion" of a block-based storage can refer to a collection of one or more storage devices (or portions of the one or more storage devices). The ability of any computing node of the DBMS to access any part of the object store increases flexibility when accessing data in the object store.

A further benefit offered by an object store is that the object store is associated with various tools and a programming interface (e.g., an application programming interface or API) that provides various functionalities that may be useful to the DBMS or the DBMS provider. For example, the tools and/or API of an object store can report usage or performance metrics at the granularity of objects stored in the object store. Being able to report usage or performance metrics at the object granularity provides finer granularity than possible with block-based storage, for which usage or performance metrics are reported at the storage device level, e.g., at the level of a storage device of a block-based storage. Usage or performance metrics can generally be referred to as "operational metrics," which can include any or some combination of the following: utilization of a resource (e.g., a processing resource, a storage resource, a communication resource, a program, or another type of resource), performance of a resource, an error rate of a resource, or any other metric of a DBMS.

FIG. 1 is a block diagram of an example arrangement that includes a DBMS 102 and a remote object store 104 (more simply "object store 104"). The object store 104 stores objects 114-1 to 114-N, where N≥1. In some examples, the object 114-1 may contain one or more base tables 150, and the object 114-N may contain spool data 152 used by the DBMS 102 during database operations performed in response to database queries (e.g., SQL queries) or other types of requests. The base table(s) 150 is (are) part of primary data of the DBMS 102. Other objects (not shown) in the object store 104 may contain base tables and/or spool data.

The object store 104 can be of any of various different types of object stores. For example, the object store 104 can be according to any of the following: Simple Storage Service (S3) from AMAZON WEB SERVICES (AWS), Google Cloud Storage, Microsoft AZURE blob storage, and so forth.

In some examples, the object store 104 is part of a cloud computing environment 106. A "cloud computing environment" (or more simply "cloud") can refer to any infrastructure, including computing, storage, and communication resources, that can be accessed remotely by customers on-demand over a network, such as a network 108 shown in FIG. 1. Alternatively, the object store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

As used here, an "object" can refer to any separately identifiable or addressable unit of data. In some examples, the objects of the object store 104 can be in the form of files, such as according to the Apache Parquet format. Apache Parquet specifies an open source, column-oriented data file format to store data associated with database tables. In other examples, the objects of the object store 104 may be according to the Optimized Row Columnar (ORC) file format. In other examples, the objects 114 of the object store 104 can be according to other formats.

Database queries 112 can be submitted by one or more client devices 110 to the DBMS 102. The client devices 110 can include any or some combination of the following: a server computer, a desktop computer, a notebook computer, a tablet computer, a smartphone, a game appliance, a vehicle, a household appliance, or any other type of electronic device.

The DBMS 102 includes one or more computing nodes 116. A "computing node" can refer to a computer, a processor, a core of a processor, or any other computing resource. Each computing node 116 can execute one or more processing modules 118, which are implemented as machine-readable instructions executable by a processing resource of the computing node 116. A processing module (PM) 118 executes tasks of a database operation for a database query received by the DBMS 102. The processing modules 118 can execute database operation tasks in parallel. Examples of database operation tasks include inserting, updating, and reading data, among other tasks.

Although FIG. 1 shows an example in which each computing node 116 runs multiple processing modules 118, in some examples, a computing node 116 can execute just one processing module 118.

In some examples, the DBMS 102 includes an optimizer 120 that is able to generate a query plan for a database operation to be executed by the processing modules 118 in response to a database query. For a given database query, the optimizer 120 can consider multiple candidate query plans and select the query plan from among the multiple candidate query plans with the least cost, for example. A "query plan" refers to a collection of tasks (steps) to be performed to process a database query. The tasks (steps) can include inserting rows into a table, updating rows of a table, deleting rows from a table, reading data, creating tables such as primary tables and spool tables, sorting rows of a table, joining tables, and other tasks. Different tasks of the query plan may be deployed to respective processing modules 118 for execution by the respective processing modules 118.

In other examples, the optimizer 120 can be provided outside the DBMS 102. In such examples, the optimizer 120 may also be referred to as a "global planner" that develops query plans for one or more DBMSs.

The optimizer 120 (whether inside the DMBS 102 or outside the DMBS 102) includes a spool storage planner 122 according to some implementations of the present disclosure for indicating whether any given portion of spool data is to be stored in the object store 104 or in a local block-based storage 124 (or more simply "block-based storage 124") connected over a link 126 to the DBMS 102. The spool storage planner 122 may be implemented using machine-readable instructions, for example, executed by a processing resource of the DBMS 102. Although FIG. 1 shows the spool storage planner 122 as being part of the optimizer 120, in other examples, the spool storage planner 122 may be separate from the optimizer 120. As shown in FIG. 1, the block-based storage 124 stores one or more base tables 156 and spool data 158.

As noted above, a block-based storage stores data associated with a DBMS in blocks, where each block has a specified size. More generally, instead of using a block-based storage, a local DBMS storage can be connected over the link 126 to the DBMS 102. A "local DBMS storage" refers to a storage that is accessible by the DBMS 102 with lower latency than an object store that may be deployed in a remote computing environment. The local DBMS storage can be implemented with storage devices connected to the DBMS 102 or with cloud-based storage resources that are part of a cloud.

When a database query 112 involving spool data is received at the DBMS 102, the optimizer 120 generates a query plan including database operation tasks that are sent by the optimizer 120 to the processing modules 118 for processing. The optimizer 120 further sends indications to each of the processing modules 118 regarding whether an instance of spool data is to be stored in the object store 104 or the block-based storage 124. The indications sent by the optimizer 120 can be produced by the spool storage planner 122 that considers one or more factors in determining whether any given instance of spool data is to be stored in the object store 104 or the block-based storage 124.

Factors considered can include any or some combination of the following: a size of an instance of spool data, a frequency of update of the instance of spool data, a frequency of access of the instance of spool data, whether metrics (e.g., usage or performance metrics) are to be collected for the instance of spool data, or any other factor. As examples, the spool storage planner 122 can indicate that a given instance of spool data is to be stored in an object of the object store 104 if the size of the given instance of spool data exceeds a threshold size, and the spool storage planner 122 can indicate that the given instance of spool data is to be stored in the block-based storage 124 if the size of the given instance of spool data does not exceed the threshold size.

As further examples, the spool storage planner 122 can indicate that the given instance of spool data is to be stored in an object of the object store 104 if a predicted frequency of update of the given instance of spool data exceeds a threshold update frequency, and the spool storage planner 122 can indicate that the given instance of spool data is to be stored in the block-based storage 124 if the predicted frequency of update of the given instance of spool data does not exceed the threshold update frequency.

As additional examples, the spool storage planner 122 can indicate that the given instance of spool data is to be stored in an object of the object store 104 if a predicted frequency of access of the given instance of spool data exceeds a threshold access frequency, and the spool storage planner 122 can indicate that the given instance of spool data is to be stored in the block-based storage 124 if the predicted frequency of access of the given instance of spool data does not exceed the threshold access frequency.

In other examples, the spool storage planner 122 can indicate that the given instance of spool data is to be stored in an object of the object store 104 if specific functionality (e.g., collection of metrics) is to be performed for the given instance of spool data, and the spool storage planner 122 can indicate that the given instance of spool data is to be stored in the block-based storage 124 if the specific functionality is not to be performed for the given instance of spool data.

The indication of whether an instance of spool data is to be stored in the object store 104 or the block-based storage 124 can be in the form of a flag or other indicator. If the flag is set to a first value, a processing module 118 stores the instance of spool data in the object store 104. On the other hand, if the flag is set to a different second value, a processing module 118 stores the instance of spool data in the block-based storage 124. The flag or other indicator can be associated with each respective instance of spool data and can be included in information sent by the optimizer 120 to each processing module 118 so that the processing module 118 can store the respective instance of spool data in the appropriate storage (the object store 104 or the block-based storage 124).

The indication from the optimizer 120 regarding whether a given instance of spool data is to be stored in the object store 104 or the block-based storage 124 may be a recommendation from the optimizer 120. A processing module 118 may or may not follow the recommendation from the optimizer 120. The processing module 118 in some examples can make an independent assessment of whether to use the object store 104 or the block-based storage 124 to store the given instance of spool data. For example, the processing module 118 may detect an increased latency in communications with the object store 104, in which case the processing module 118 may decide to use the block-based storage 124 to store the given instance of spool data even though the optimizer 120 recommended using the object store 104 to store the given instance of spool data. Note that the optimizer 120 decides on a query plan based predicted costs before execution of the query plan. A processing module 118 may override the decision of the optimizer 120 based on more real time factors according to a current state of the DBMS, such as the frequency of access of certain data from a previous step of the query plan.

Each computing node 116 of the DBMS 102 further includes a memory 134, which can be implemented using one or more memory devices, such as any or some combination of the following: a dynamic random access memory (DRAM) device, a static random access memory (SRAM) device, a flash memory device, or any other type of memory device.

The memory 134 in a computing node 116 can store the following data structures: a cache 140 and a buffer 142. In some examples, there is one instance of a cache 140 and a buffer 142 for each processing module 118. Thus, if there are multiple processing modules 118 in a computing node 116, the memory 134 will contain multiple instances of the cache 140 and the buffer 142.

The cache 140 is referred to as a file system segment (FSG) cache in some examples. The cache 140 is a write and read cache that can host data blocks and indexes of a B-tree (discussed further below). An FSG cache may be part of an FSG subsystem in the DBMS 102 that has direct access to sectors (a sector can also be referred to as a "pdisk") of the block-based storage 124. The FSG subsystem has control (based on instructions from a file system that manages storage of data in the block-based storage 124) of which sector to read and write data. The FSG subsystem supports fast and efficient block-based reads and writes to pdisks of the block-based storage 124, which can be many times faster than object-based reads and writes to object stores (such as the object store 104).

The buffer 142 is part of a memory management subsystem that provides a temporary scratch space in the memory 134, where the temporary scratch space can be used to perform common work, such as providing a buffer to store and manipulate data prior to writing the data, such as to pdisks of the block-based storage 124.

Spool data can be stored using a B-tree. A "B-tree" refers to a hierarchical data structure that has multiple levels of entries, including leaf entries (at the bottom level of the B-tree) containing data blocks. The multiple levels of the B-tree also includes a root entry (at the top level of the B-tree) that contains a master index, and an intermediate level of entries that contain intermediate indexes (such as cylindrical indexes or CIs). Although some examples refer to a B-tree, it is noted that in other examples, other types of reference information (including indexes or other reference information) may be employed to manage access of spool data.

In examples where there are multiple processing modules 118, there are multiple B-trees for the spool data associated with the respective processing modules 118. For example, each processing module 118 may be associated with its individual B-tree for storing spool data.

Figure 2:
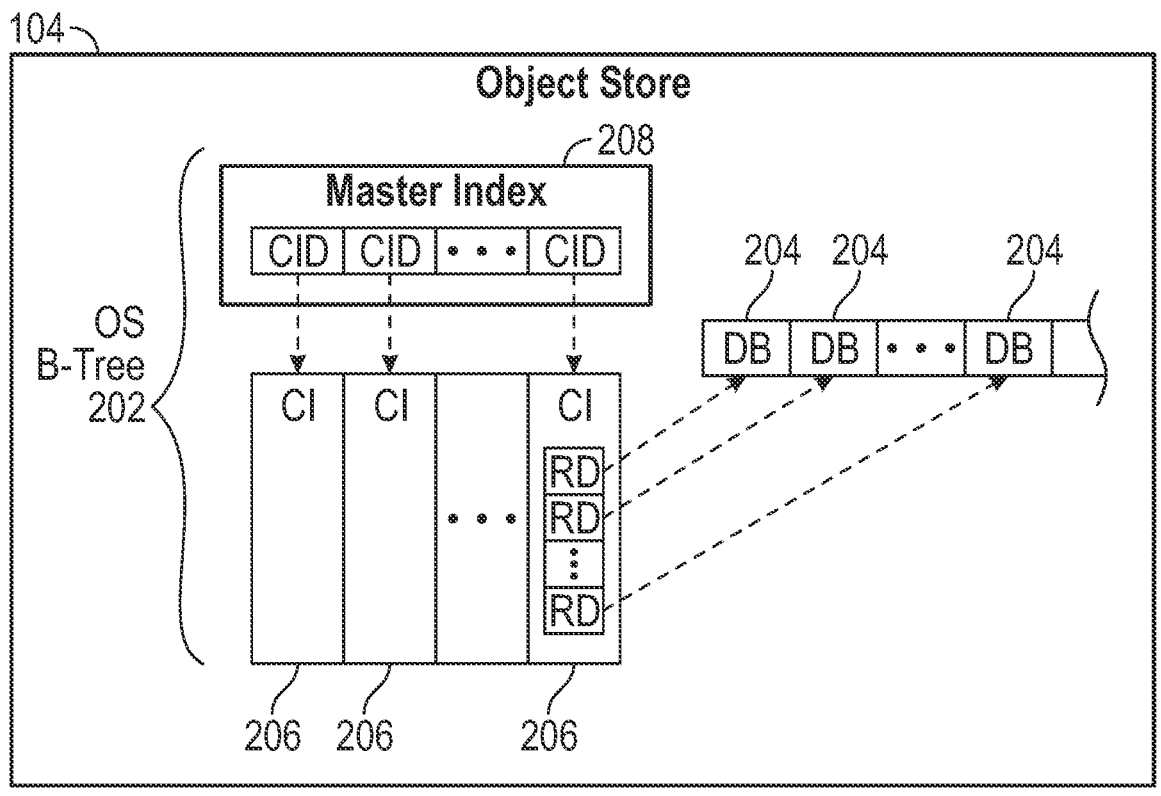
FIG. 2 is a block diagram of an object spool B-tree in an object store, according to some examples of the present disclosure.

FIG. 2 shows an object spool (OS) B-tree 202 that has leaf entries 204 containing data blocks (DBs), where each data block stores a portion of spool data. A data block belongs to a chunk. In some examples, a chunk can be 16 megabytes (MB) in size, although in other examples, a chunk can have a different size. Each chunk forms an object of the object store 104. There may be one OS B-tree 202 per processing module 118 per spool table.

The OS B-tree 202 can be part of the object store 104. The intermediate level above the leaf entries includes intermediate entries 206 containing intermediate indexes (e.g., CIs).

Each intermediate index (in a respective intermediate entry 206) contains reference descriptors (RDs). Each RD includes a pointer to a respective data block, information of the chunk that contains the respective data block, and metadata summarizing the content of the respective data block.

The OS B-tree 202 includes a root entry 208 that has a master index. The master index includes cylindrical index descriptors (CIDs), where a CID can refer to a respective CI in a corresponding intermediate entry 206.

In some examples, there may be one OS B-tree associated with a respective spool table (or more generally, a respective instance of spool data) stored in the object store 104. If there are multiple spool tables (or more generally, multiple instances of spool data), then there will be multiple OS B-trees in the object store 104. The indexes (including the master index and the CIs) are written as objects to the object store 104. Some portion of an OS B-tree (such as the master index, one or more CIs, and one or more data blocks) may be stored in a cache 140 associated with a processing module 118 that is performing a database operation.

Figure 3:
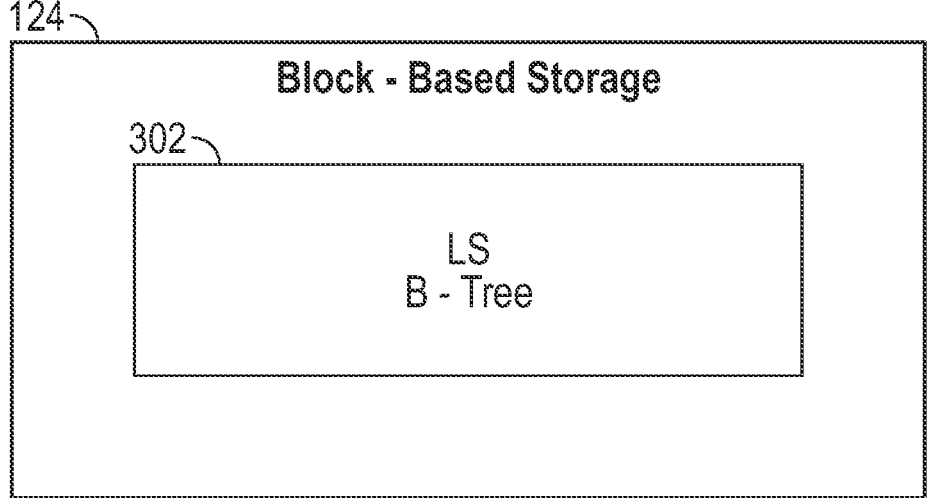
FIG. 3 is a block diagram of a local spool B-tree in a local block-based storage, according to some examples of the present disclosure.

FIG. 3 is a block diagram of a local spool (LS) B-tree 302 that has a hierarchical structure similar to the structure shown in FIG. 2. The LS B-tree 302 includes leaf entries containing data blocks that may include spool data. There may be one LS B-tree 302 per processing module 118.

It is noted that similar B-trees can be maintained for primary data.

When a processing module 118 stores an instance of spool data into the object store 104, the instance of spool data is stored in data blocks of the OS B-tree 202. Similarly, when a processing module 118 stores an instance of spool data into the block-based storage 124, the instance of spool data is stored in data blocks of the LS B-tree 302.

As noted above, one of the factors used by the spool storage planner 122 in deciding whether to store spool data in the object store 104 (e.g., into an OS B-tree) or in the block-based storage 124 (e.g., into an LS B-tree) is the size of the spool data. If the size of the spool data exceeds a threshold size, then the spool storage planner 122 may make a determination to store the spool data in the object store 104. The threshold size can be based on a size of the cache 140. For example, if the cache 140 has a size CACHE_SIZE, then the threshold size may be a specified X % of CACHE_SIZE, where X is a positive non-zero value.

The OS B-tree 202 can make up for the object store latency by grouping a relatively large number of data blocks into chunks. Each chunk then becomes an object in the object store 104. Further, compression is applied to each data block to reduce its size, thus allowing for more data to fit in a chunk.

Creating an Object Store Spool Table

An object store spool table refers to a spool table to be stored in the object store 104. To create the object store spool table, a processing module 118 appends each chunk of spool data to a respective buffer 142 associated with the processing module 118. The buffer 142 is held open until the buffer 142 is full or the end of the spool table is encountered. As spool data is generally written once and in an append fashion, the processing module 118 can place a table lock on the spool table during creation of the spool table. This allows the accumulation of data blocks and the maintenance of the indexes describing those data blocks (including the master index of an OS B-tree) without concern for competing tasks trying to read or modify the spool table. If the optimizer 120 estimated the size of the spool table is relatively large, the data blocks are not kept in the cache 140 associated with the processing module 118, as doing so will flood the cache 140 with data blocks that may not fit in the limited cache space.

Once the buffer 142 is full, the processing module 118 passes the content of the buffer 142 to an interface associated with the object store 104 to write the content of the buffer 142 to the object store 104. The interface may include an application programming interface (API) for example, which may include routines that can be called by the processing module 118 to write the content of the buffer 142 to an object of the object store 104. As part of writing data blocks (from the buffer 142) containing portions of the spool table, the data in the data blocks may be compressed and/or encrypted.

Once the write completes, the buffer 142 is reinitialized for the next set of incoming data blocks of the spool table that is being created. The indexes of the OS B-tree continue to be updated as new incoming blocks are added. Once any CI of the OS B-tree is full, a write of the CI is performed to write the CI into an object of the object store 104 using the API of the object store 104. In some examples, a copy of the indexes of the OS B-tree (and possibly some data blocks) written to the object store 104 can be kept in the cache 140 in preparation for subsequent consumption of the indexes. Portions of the OS B-tree can be kept in the cache 140 for faster access until synchronization points are reached or until the end of a database operation.

This process continues until the entire spool table is created. Along the way, the master index of the OS B-tree is written at key points in time and finally when the spool table is completely created. The master index of the OS B-tree can also be held in the cache 140 in preparation for a subsequent read.

In further examples, the DBMS 102 may implement background tasks to perform reads and writes of the object store 104. To write the content of the buffer 142 to the object store 104, the processing module 118 can send a command to a background task to write the content of the buffer 142 to the object store 104, thus freeing the processing module 118 from having to schedule the input/output (I/O) to the object store 104. This allows the processing module 118 to proceed with other tasks, such as to generate the next set of data blocks for the spool table being created.

Reading an Object Store Spool Table

When a processing module 118 is to consume a spool table according to a query plan from the optimizer 120, the processing module 118 first allocates a buffer 142. The processing module 118 then locks the spool table and issues the read of the spool table from the object store 104 through an API of the object store 104, to retrieve a chunk containing a targeted data block. As part of reading portions of the spool table from the object store 104, the spool data is decompressed and/or decrypted.

Upon completion of the retrieval of the chunk into the buffer 142, the processing module 118 can optionally: (1) extract all blocks contained in the retrieved chunk and copying the blocks into the cache 140 associated with the processing module 118, or (2) extract a single targeted data block and writing the targeted data block into the cache 140. Note that this "copy" operation of a data block to the cache 140 is essentially free since the data block itself has to be decompressed and/or decrypted. Decompression and/or decryption do not happen in-place and involve use of a second memory location, thus negating the cost of the copy operation from the buffer 142 to the cache 140.

The decision on whether to extract a single block or extracting all blocks in the chunk may be based on the specific operation being performed. In general, most spool reads may be full table scans, and in most cases, the DBMS 102 may extract the entire chunk and write the chunk to the cache 140. In other cases that an operation targets only a small subset of rows dispersed across different sections of the spool table, the DBMS can choose to only extract one or a few data blocks and copy such data blocks to the cache 140.

Each processing module 118 effectively implements a translation layer between objects and data blocks when writing or reading spool data. To write spool data to the object store 104, the translation layer implemented by a processing module 118 translates data blocks containing the spool data into objects in the object store 104. To read spool data, the translation layer implemented by a processing module 118 translates objects containing the spool data into data blocks for consumption in the DBMS 102.

Distributed Access of Spool Data

The indexes and data blocks (containing spool data) of an OS B-tree (e.g., 202 in FIG. 2) can be formatted in a way so that any processing module 118 on any computing node 116 in the DBMS 102 can consume the OS B-tree (or any portion of the OS B-tree). This is contrasted with an LS B-tree (e.g., 302 in FIG. 3), whose data blocks and indexes are written to dedicated pdisks associated with respective processing modules 118, such that the processing module 118 that created a given instance of spool data is the sole consumer of the given instance of spool data.

The OS B-tree (including its master index, CIs, and data blocks) (as well as other metadata associated with the OS B-tree) does not include any information that is specific to any individual processing module 118. For example, the OS B-tree does not contain an identifier of the processing module 118, or does not have any relative offsets or identifiers that is known only if read from a particular processing module 118. Instead, the OS B-tree is laid out in a fashion such that an entirely different computing node, or even an entirely different DBMS, can consume spool data written by a different computing node or DBMS. This capability is referred to as a distributed access capability relating to access of spool data.

The distributed access capability allows for many use cases. As the spool table is self-contained, each of one or more compute clusters that are dedicated to processing spool-based workloads (which includes tasks involving spool data) can generate a processed result set (including spool data), and pass the result set back to a primary compute cluster for further processing. A compute cluster includes a group of computing nodes. The primary compute cluster can then use the spool data in the received result set(s) to derive further results that can be reported back to a client device that requested the further results, such as based on submitting a database query.

Additionally, the capability to share spool data allows multiple compute clusters to consume the same spool data at the same time. This may be useful in some query processing situations in which multiple compute clusters may want to perform different operations in parallel on the same result set.

The distributed access capability additionally allows the optimizer 120 additional options on how to plan a query, where to execute the query, and how to cost the query plan.

Figure 4:
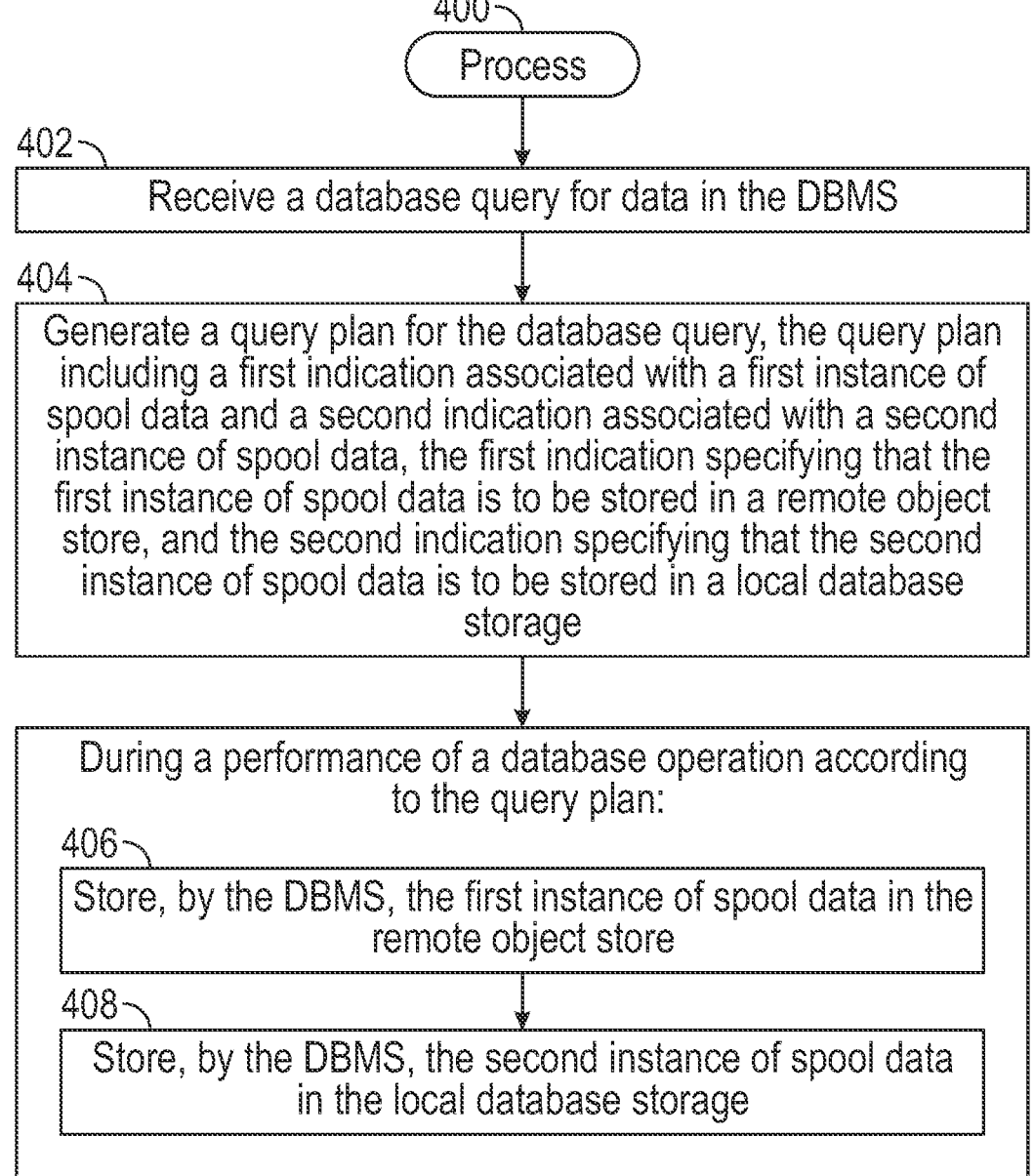
FIG. 4 is a flow diagram of a process relating to using a remote object store to store spool data, according to some examples.

FIG. 4 is a flow diagram of a process 400 according to some examples. The process 400 may be performed by a DBMS (e.g., 102 in FIG. 1) and possibly by a computing entity outside the DBMS, such as an optimizer (global planner) outside the DBMS.

The process 400 includes receiving (at 402) a database query for data in the DBMS. The database query can be received by an optimizer (e.g., 120), for example. The optimizer may be in the DBMS or outside the DBMS.

The process 400 includes generating (at 404) a query plan for the database query. The query plan is generated by the optimize, and the query plan includes a first indication associated with a first instance of spool data and a second indication associated with a second instance of spool data, the first indication specifying that the first instance of spool data is to be stored in a remote object store (e.g., 104 in FIG. 1), and the second indication specifying that the second instance of spool data is to be stored in a local database storage (e.g., 124 in FIG. 1).

During a performance of a database operation according to the query plan, the DBMS stores (at 406) the first instance of spool data in the remote object store, and stores (at 408) the second instance of spool data in the local database storage.

The optimizer 120 (including the spool storage planner 122) and the processing modules 118 of FIG. 1 may be implemented using machine-readable instructions executable by one or more hardware processors, including hardware processors of the computing nodes 116 and any other computing nodes.

A hardware processor can include a microprocessor, a core of a multi-core microprocessor, a microcontroller, a programmable integrated circuit, a programmable gate array, or another hardware processing circuit.

The machine-readable instructions can be stored in a storage medium, which can include any or some combination of the following: a semiconductor memory device such as a DRAM or SRAM, an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:

at least one hardware processor; and a plurality of processing modules with access to a remote object store and a local database storage associated with the database system, wherein the plurality of processing modules is executable by the at least one hardware processor to perform a database operation that involves use of a plurality of instances of spool data, wherein the plurality of processing modules are to store a first instance of spool data in the remote object store based on a first characteristic of the first instance of spool data and the plurality of processing modules are to store a second instance of spool data in the local database storage based on a second characteristic of the second instance of spool data, and wherein the remote object store and local database storage comprise different pre-allocation procedures.

2. The database system of claim 1, wherein the first and second characteristics comprise different sizes of the first and second instances of spool data.

3. The database system of claim 1, further comprising:

a non-transitory storage medium storing instructions executable by one or more processors to:

determine, based on one or more factors, whether a given instance of spool data is to be stored in the remote object store or the local database storage.

4. The database system of claim 3, wherein the one or more factors comprise a size of the given instance of spool data.

5. The database system of claim 4, wherein the instructions executable are by the one or more processors to:

compare the size of the given instance of spool data to a threshold size, and select one of the remote object store or the local database storage to store the given instance of spool data based on the comparison of the size of the given instance of spool data to the threshold size.

6. The database system of claim 5, further comprising:

a cache to store information including a portion of reference information including indexes for the given instance of spool data, wherein the threshold size is based on a size of the cache.

7. The database system of claim 3, wherein the one or more factors comprise a frequency of update of the given instance of spool data.

8. The database system of claim 3, wherein the one or more factors comprise a frequency of access of the given instance of spool data.

9. The database system of claim 3, wherein the one or more factors comprise an indication of whether operational metrics are to be collected for the given instance of spool data.

10. The database system of claim 3, wherein the instructions are part of an optimizer for the database system.

11. The database system of claim 1, further comprising: a buffer, wherein a processing module of the plurality of processing modules is executable by the at least one hardware processor to create the first instance of spool data by:

writing data blocks comprising portions of the first instance of spool data to the buffer, and based on a trigger event, write content of the buffer to the remote object store using an application programming interface (API) of the remote object store.

12. The database system of claim 1, comprising:

a plurality of computing nodes including respective hardware processors, wherein the plurality of processing modules are executable by the respective hardware processors in the plurality of computing nodes, wherein the first instance of spool data in the remote object store is accessible by any computing node of the plurality of computing nodes.

13. The database system of claim 12, wherein the first instance of spool data is stored in the remote object store without any information specific to an individual processing module of the plurality of processing modules.

14. The database system of claim 12, wherein the plurality of computing nodes comprises a first cluster of computing nodes and a second cluster of computing nodes, wherein the first cluster of computing nodes is to:

process a spool-based workload involving the first instance of spool data stored in the remote object store, and provide a result of the spool-based workload to the second cluster of computing nodes for further processing.

15. The database system of claim 1, wherein the local database storage is a block-based storage.

16. The database system of claim 1, wherein the plurality of processing modules are to store the first instance of spool data in the remote object store by storing portions of the first instance of spool data in a B-tree for spool data stored in the remote object store.

17. A method comprising:

receiving a database query for data in a database system;

generating a query plan for the database query, the query plan comprising a first indication associated with a first instance of spool data and a second indication associated with a second instance of spool data, the first indication specifying that the first instance of spool data is to be stored in a remote object store, and the second indication specifying that the second instance of spool data is to be stored in a local database storage; and during a performance of a database operation according to the query plan, storing, by the database system, the first instance of spool data in the remote object store, and storing, by the database system, the second instance of spool data in the local database storage, wherein the remote object store and local database storage comprise different pre-allocation procedures.

18. The method of claim 17, wherein the database system is connected to the local database storage over a first communication link with lower latency than a second communication link connecting the database system to the remote object store.

19. The method of claim 17, comprising:

determining, by an optimizer based on one or more factors, whether a given instance of spool data is to be stored in the remote object store or the local database storage.

20. A non-transitory machine-readable storage medium comprising instructions that upon execution cause a system to:

receive a database query for data in a database system;

generate a query plan for the database query, the query plan comprising a first indication associated with a first instance of spool data and a second indication associated with a second instance of spool data, the first indication specifying that the first instance of spool data is to be stored in a remote object store, and the second indication specifying that the second instance of spool data is to be stored in a local database storage; and during a performance of a database operation according to the query plan, store, by the database system, the first instance of spool data in the remote object store, and store, by the database system, the second instance of spool data in the local database storage, wherein the remote object store and local database storage comprise different pre-allocation procedures.

5

* * * * *